(12) United States Patent
Whitney

(10) Patent No.: US 6,178,592 B1
(45) Date of Patent: Jan. 30, 2001

(54) BALLAST FRAMES FOR MAINTAINING FLEXIBLE MESH SCREEN VENTS UNCLOGGED

(75) Inventor: James C Whitney, Norwalk, CT (US)

(73) Assignee: Woodland Power Products Inc., West Haven, CT (US)

( * ) Notice: Under 35 U.S.C. 154(b), the term of this patent shall be extended for 0 days.

(21) Appl. No.: 09/430,717

(22) Filed: Oct. 29, 1999

(51) Int. Cl.⁷ ........................................ E01H 1/08
(52) U.S. Cl. ........................ 15/347; 15/339; 55/356; 55/367; 55/492
(58) Field of Search ................ 15/347, 352; 55/301, 55/356, 385.1, 467, 490, 492, 495

(56) References Cited

U.S. PATENT DOCUMENTS

| | | | | |
|---|---|---|---|---|
| 2,337,936 | * | 12/1943 | Sellers ................................... | 15/347 |
| 2,803,847 | * | 8/1957 | Hobbs .................................. | 15/347 X |
| 3,524,211 | * | 8/1970 | Wolf ..................................... | 55/301 X |
| 3,624,989 | * | 12/1971 | Gatheridge .......................... | 15/347 X |
| 3,790,986 | * | 2/1974 | Burger ................................. | 15/347 X |
| 3,813,725 | * | 6/1974 | Rinker ................................. | 15/337 X |
| 4,999,038 | * | 3/1991 | Lundberg ............................ | 55/495 X |
| 6,029,312 | * | 2/2000 | Whitney .................................. | 15/347 |

\* cited by examiner

*Primary Examiner*—Chris K. Moore
(74) *Attorney, Agent, or Firm*—Ware Fressola Van Der Sluys & Adolphson LLP

(57) ABSTRACT

A lightweight ballast frame with a metal rim spanned by one or more metal mullions is loosely anchored at several points to a flexible screen mesh covering a vent formed in an enclosure defining a collection chamber and providing an escape portal for the exhaust airstream which has deposited entrained debris in the chamber. The ballast frame resists outward ballooning of the flexible screen caused by the airstream, and promotes scavenging of debris adhering to the interior of the flexible screen.

9 Claims, 5 Drawing Sheets

BALLAST FRAMES FOR MAINTAINING FLEXIBLE MESH SCREEN VENTS UNCLOGGED

This invention relates to ballast frames placed on flexible mesh screen vents in flexible leaf collection bags and more particularly to ballast frames placed on screen mesh vents in large collection bags designed to collect large volumes of organic debris delivered by high velocity blower-driven airstreams, producing externally convex "ballooning" of the collection bag.

These ballast frames are considered to be improvements on the collector bags disclosed in my co-pending U.S. patent application Ser. No. 08/984,335 filed Dec. 3, 1997, now U.S. Pat. No. 6,029,312, issued Feb. 29, 2000, and its disclosure is incorporated herein by reference.

BACKGROUND OF THE INVENTION

The collection of leaves, grass clippings and other organic debris from lawn mowers into flexible collection bags is well known, and like vacuum cleaners, these collection bags rely on the porosity of woven fabric bags to exhaust the airstream carrying the debris after it is deposited in the bag. High volume lawn tractor mowers often collect the organic debris in collectors carried on a towed trailer, such as the large volume collector bags disclosed in my co-pending patent application. Even if such collector bags are made of tightly woven fabrics with minimum porosity, they may have mesh screen panels allowing exhaust air to escape after depositing entrained debris.

Fine particles and lighter weight pieces of leaves, grass clippings and other organic debris tend to clog the pores of woven fabric bags, and the pressure differential between the blower-driven internal bag inflation pressure and the external ambient atmosphere drives leaves and grass clippings against the interior surface of any mesh vent and plasters them there, partially embedded or caught in the mesh impeding the escape of exhaust air after it has delivered debris to the bag's interior. The resulting back pressure tends to resist delivery and deposit of more debris.

BRIEF SUMMARY OF THE INVENTION

It has now been discovered that by counteracting the ballooning convex curvature of the mesh screen or vent, and positioning it in a substantially flat plane interposed at an acute angle to the travel direction of the arriving debris-laden airstream, the high velocity of this blower-driven stream literally peels any accumulated debris, clippings or leaves away from the interior of the mesh screen, promoting the escape of exhaust air therethrough.

A flat, rigid, open ballast frame overlying each mesh screen or vent and secured thereto by plastic cable ties, metal "hog rings" or other loose fastenings at several spaced-apart locations maintains the mesh screen in a suitable substantially flat plane. In any instance where the mesh screen is normally oriented close to horizontal in the upper part of the collector bag, if a distal edge of the ballast frame remote from the arriving airstream is weighted, the flattened mesh screen is thereby tilted aslant by an acute scavenging angle, measured from tangency to the screen to the airstream's delivery path, enabling the arriving airstream to peel any accumulated debris from the flattened inner surface of the screen.

Accordingly, a principal object of the invention is to facilitate unclogging of accumulated lightweight debris from the interior surface of mesh screen vents releasing exhaust airstreams from debris collection bags.

Another object is to achieve such unclogging by utilizing a substantially flat, economical mullioned frame loosely anchored to the mesh screen at a plurality of anchor points.

A further object is to enhance the removal of accumulated debris by orienting the assembly of mullioned frame and mesh screen edgewise in the arriving airstream and slanting at a small acute scavenging angle to the travel path of the airstream.

Still another object is to provide a downstream ballast weight on said mullioned frame, automatically achieving the acute slant angle when the screen-frame assembly is positioned in a generally horizontal position.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be made to the following detailed description taken in connection with the accompanying drawings, in which.

BEST MODE FOR CARRYING OUT THE INVENTION

Figure 1:
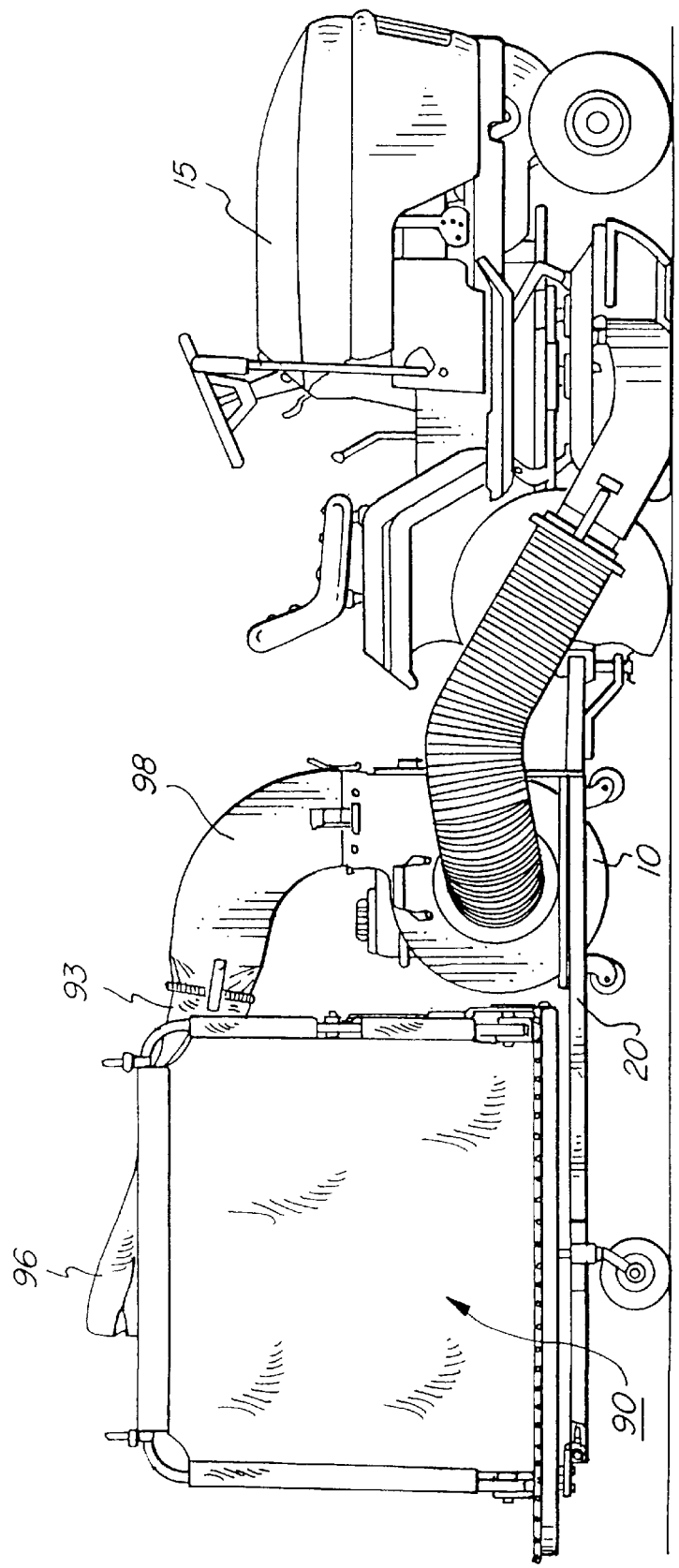
FIG. 1 is a side elevation view of a lawn tractor and trailer assembly with a large flexible fabric collector bag deployed on the trailer.

The mullioned ballast frames of this invention shown in detail in FIGS. 6, 7A, 7B and 8 are extremely light in weight and economical to manufacture. They are preferably formed of rigid steel rods of 4 mm or 5/32" diameter, with their ends welded together to form a rectangular peripheral frame 100, formed of side rods 101, and upstream end rod 102 and a downstream end rod 103. In its preferred form, this frame 100 is provided with at least two mullion rods spanning its interior, a longitudinal rod 104 parallel to the side rods 101, and a transverse rod 106 parallel to the end rods 102 and 103. Additional longitudinal or transverse rods 104 or 106 may be added, but the mullion rods serve only to maintain the shape of the ballast frame, and should not significantly reduce the area of the open inter-mullion spaces, which provide free passage for the exhaust air escaping through the screen mesh vent 92, directed rearwardly by a deflector 96.

Figure 2:
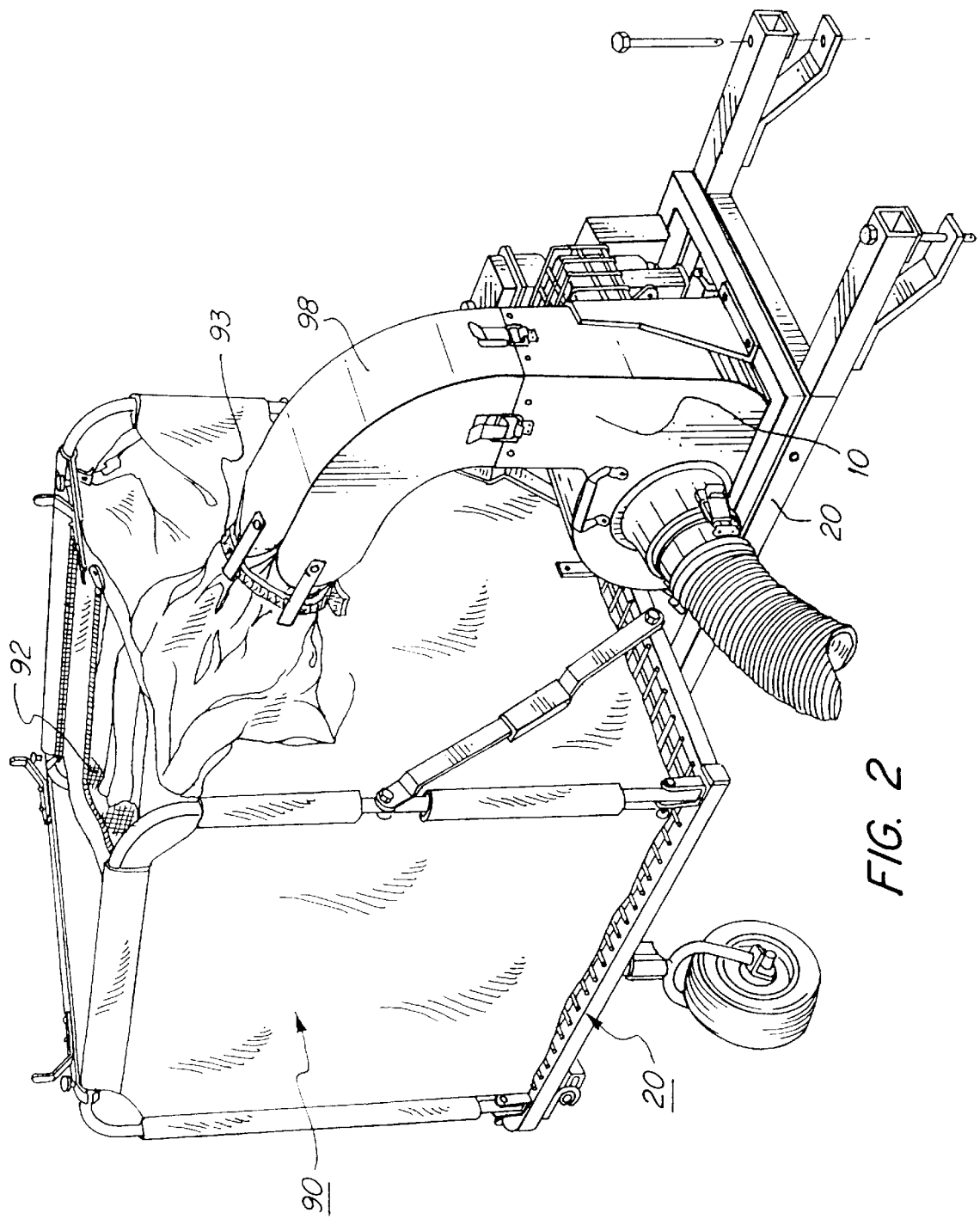
FIG. 2 is a fragmentary perspective view of the collector bag and trailer showing the blower housing and debris stream delivery conduit carrying the blower exhaust stream to the collector bag.
Figure 3:
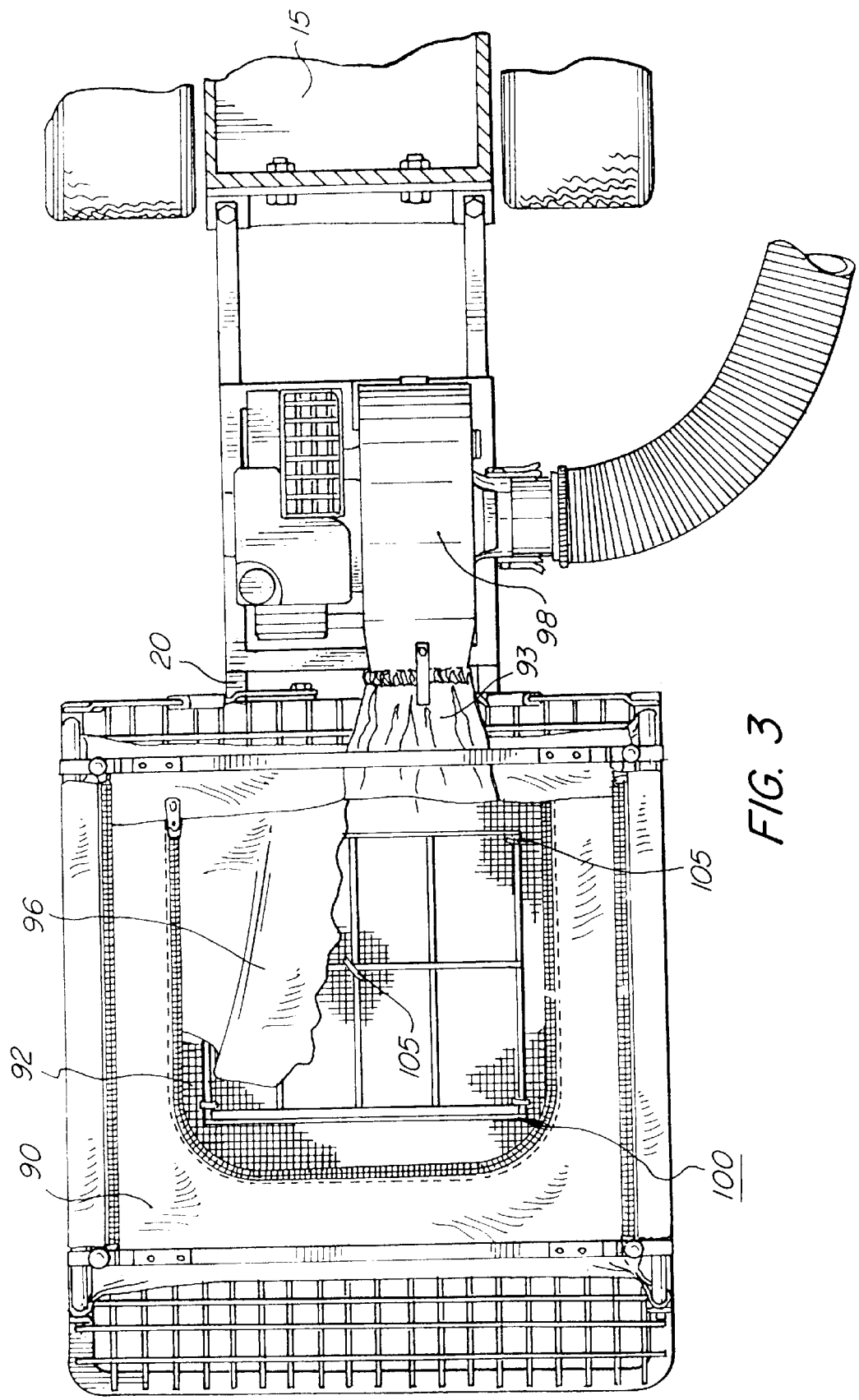
FIG. 3 is a top plan view of the same delivery conduit and collector bag, showing a mesh screen exhaust vent formed in the bag's uppermost surface.
Figure 4:
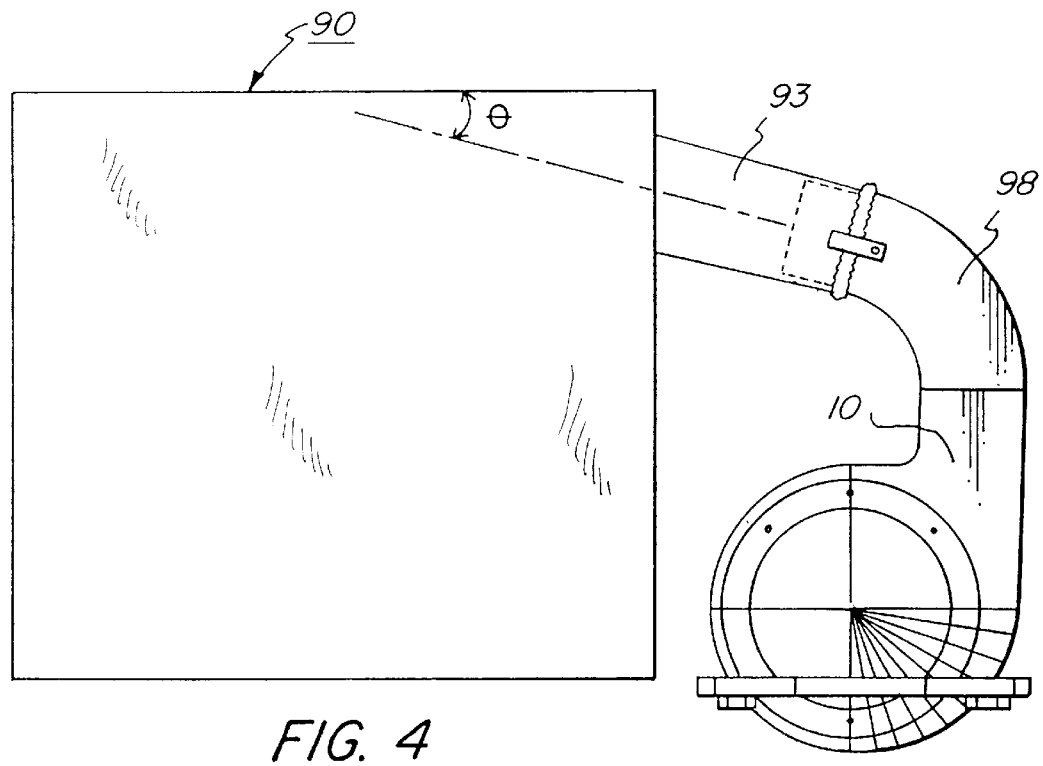
FIG. 4 is a diagrammatic side elevation view illustrating the customary orientation of the mesh screen vent interposed edgewise at a slanting acute scavenging angle in the arriving airstream.

As is clearly seen in FIGS. 1, 2 and 3, a lawn tractor and trailer assembly 15–20 carries a blower in a housing 10, drawing in an airstream carrying grass clippings, leaves, twigs and similar organic debris. The blower delivers this debris in a high velocity exhaust stream 107 carried by a delivery conduit duct 98 through an inlet port 93 into a large flexible fabric collector bag 90 carried on trailer 20. As seen in the diagram of FIG. 4, the advancing debris-laden airstream 107 enters bag 90 through inlet port 93 on an upward slanting path at an acute angle θ to the upper surface of bag 90, where the mesh screen vent panel 92 is installed. The angle θ preferably falls between 10° and 25°, and is shown in FIG. 4 as 17°.

Figure 5:
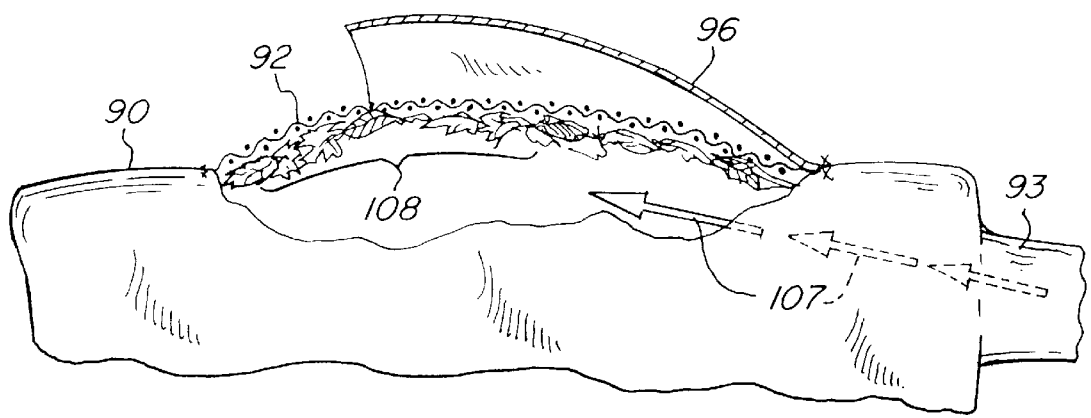
FIG. 5 is a fragmentary enlarged cross-sectional side elevation view showing outward ballooning of a prior art mesh screen vent lacking the present invention.
Figure 6:
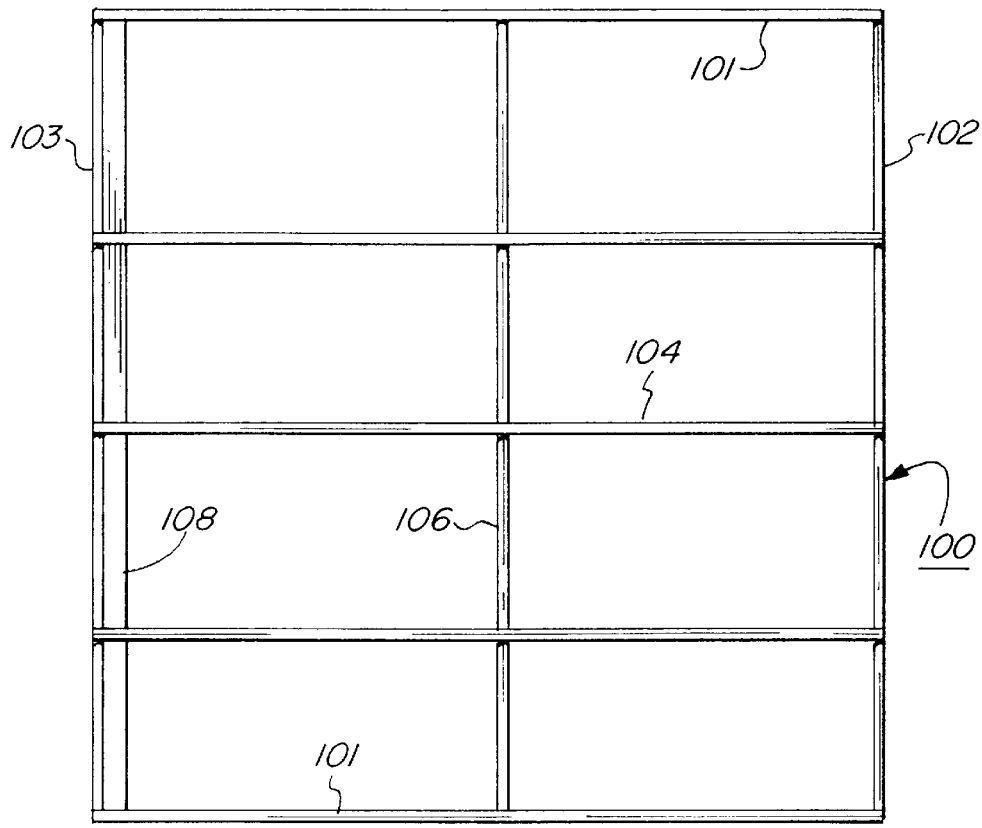
FIG. 6 is a bottom plan view of a mullioned ballast frame ready to be installed on a mesh screen vent of the kind shown in FIG. 3.

The internal air pressure produced by the blower-driven airstream tends to inflate bag 90 like a balloon, stretching screen mesh vent 92 into an upwardly curved, convex shape (FIG. 5). The normal action of the advancing airstream 107 in removing accumulated debris from the interior surface of mesh vent 92 is thereby reduced or eliminated, since the desired angle θ between airstream 107 and mesh screen vent 92 is no longer maintained.

The outward ballooning of collector bag 90 can be counteracted by the effect of ballast frame 100, loosely anchored at four to six or seven anchor points to the mesh screen vent 92 by loose fastenings 105, which may be plastic cable ties, clamped wire "hog rings", or cotter rings. These are preferably installed near the outer corners and at the center crossed mullions of frame 100, each embracing both the rods of frame 100 and the adjacent plastic strands of the open plastic mesh screen of vent 92, having ½" openings, for example.

Figure 7:
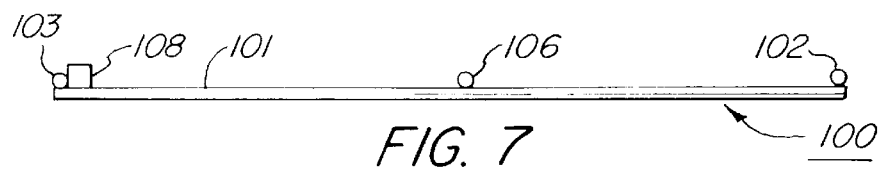
FIG. 7 is a side elevation view of the ballast frame of FIG. 6.
Figure 8:
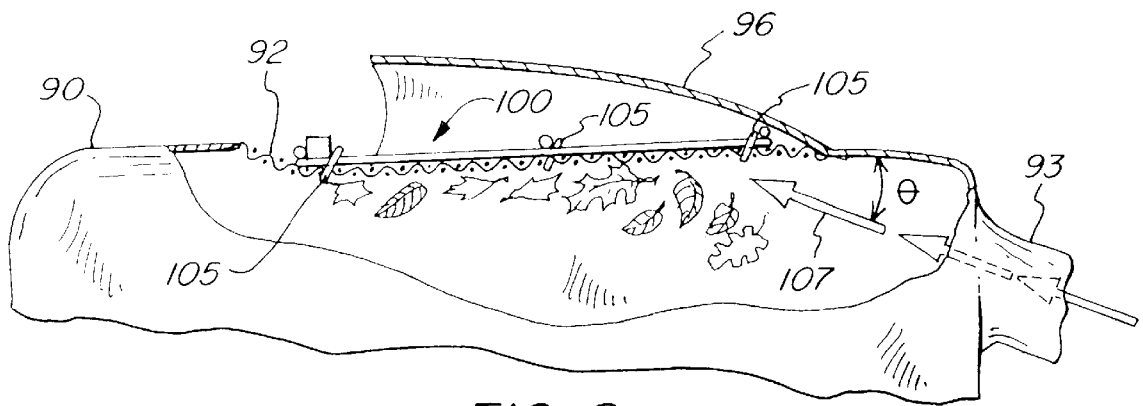
FIG. 8 is a fragmentary cross-sectional side elevation view corresponding to FIG. 5, and showing the mesh screen and ballast frame assembly in operation.

Since frame 100 is flat, as shown in FIG. 7, with a ballast weight 108 in the form of a 12 mm×12 mm or ½"×½" square steel bar welded to its downstream end, for example, it causes mesh screen vent 92 to sag inward in bag 90, and when the blower-driven high speed airstream 107 impinges on the flattened screen vent 92, acute angle θ between airstream 107 and screen vent 92 is maintained at least at about 10° or more.

This significant angle θ between a tangent to screen vent 92 and the advancing path of airstream 107 assures that the high velocity airstream will peel off any accumulated clippings, leaves or other organic debris 108 "plastered" on the inside surface of vent 92, maintaining vent 92 as the escape vent for exhaust air after it delivers entrained debris to collector bag 90, and minimizing back pressure tending to interfere with the filling of collector bag 90 with debris.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a flexible mesh screen vent forming an escape path for pressurized exhaust air after it has delivered entrained debris and deposited it in a collection chamber, the improvement in combination with said flexible mesh screen vent comprising:

A rigid ballast frame having a metal rim, metal mullions spanning said frame, and a plurality of fastenings loosely anchoring the frame in juxtaposition to said flexible mesh screen vent.

2. The combination defined in claim 1 wherein the stream of air delivering said entrained debris into said collection chamber is directed toward said flexible mesh screen vent, and wherein any tendency of said mesh screen vent to balloon outwardly, impelled by the airstream is counteracted by said ballast frame's attachment to said flexible mesh screen vent.

3. The combination defined in claim 2 wherein said airstream is obliquely directed toward said vent at an acute angle between about 10° and about 25° relative to a plane tangent to said vent.

4. The combination defined in claim 3 wherein said angle is between about 15° and about 20°.

5. The combination defined in claim 4 wherein said angle is substantially equal to 17°.

6. The combination defined in claim 3, wherein said juxtaposed frame and vent have juxtaposed upstream ends closest to said arriving airstream, and juxtaposed downstream ends furthest from said arriving airstream.

7. The combination defined in claim 6 wherein said downstream end of said frame is provided with a ballast weight supplementing the weight of the frame alone.

8. The combination defined in claim 7, wherein the flexible mesh screen vent is positioned near the top of said collection chamber and is oriented in a substantially horizontal position, whereby the supplemental downstream ballast weight urges the flexible mesh vent inwardly, further counteracting its said tendency to balloon outward.

9. The combination defined in claim 1, wherein said ballast frame lies substantially in a single plane.

\* \* \* \* \*